(12) United States Patent
Ling et al.

(10) Patent No.: US 11,099,305 B2
(45) Date of Patent: Aug. 24, 2021

(54) NEAR-EYE DISPLAY APPARATUS AND VIRTUAL/AUGMENTED REALITY SYSTEM

(71) Applicant: BOE TECHNOLOGY GROUP CO., LTD., Beijing (CN)

(72) Inventors: Qiuyu Ling, Beijing (CN); Wei Wang, Beijing (CN); Xiandong Meng, Beijing (CN); Xianqin Meng, Beijing (CN); Meng Yan, Beijing (CN); Yishan Tian, Beijing (CN); Yujiao Guo, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/862,888

(22) Filed: Apr. 30, 2020

(65) Prior Publication Data
US 2021/0181384 A1     Jun. 17, 2021

(30) Foreign Application Priority Data
Dec. 17, 2019   (CN) .......................... 201911301184.4

(51) Int. Cl.
*G02B 3/00*       (2006.01)
*G02B 27/30*      (2006.01)

(52) U.S. Cl.
CPC ........... *G02B 3/0062* (2013.01); *G02B 27/30* (2013.01)

(58) Field of Classification Search
CPC .. G02B 3/0056; G02B 3/0062; G02B 3/0068; G02B 27/30
See application file for complete search history.

(56) References Cited

U.S. PATENT DOCUMENTS

2017/0038592 A1*   2/2017   Sudo ................... G02B 3/0006

* cited by examiner

*Primary Examiner* — Ryan D Howard
(74) *Attorney, Agent, or Firm* — McDermott Will and Emery LLP

(57) ABSTRACT

A near-eye display apparatus includes a pixel island configured to emit first light, and a combined micro lens disposed at a light exit side of the pixel island. The combined micro lens includes an additional micro lens and a first micro lens. The additional micro lens is configured to diverge the first light emitted by the pixel island. The first micro lens is disposed at a side of the additional micro lens away from the pixel island, and is configured to collimate light passed through the additional micro lens. The pixel island is disposed on a focal plane of the combined micro lens.

17 Claims, 9 Drawing Sheets

NEAR-EYE DISPLAY APPARATUS AND VIRTUAL/AUGMENTED REALITY SYSTEM

CROSS-REFERENCE TO RELATED APPLICATION

This application claims priority to Chinese Patent Application No. 201911301184.4, filed on Dec. 17, 2019, which is incorporated herein by reference in its entirety.

TECHNICAL FIELD

The present disclosure relates the field of display technologies, more particularly, to a near-eye display apparatus and a virtual/augmented reality system.

BACKGROUND

Virtual Reality (VR) apparatuses and Augmented Reality (AR) apparatuses have been gradually applied to the fields of display, game, medical treatment, etc., and a near-eye display technology for realizing VR/AR has received more and more attention and research. Near-eye display is a display technology that enables a viewer to see contents close to eyes clearly. The display contents are imaged in the focusing range of the eyes by an optical system, so that the eyes can see the display contents clearly.

SUMMARY

Some embodiments of the present disclosure provide a near-eye display apparatus. The near-eye display apparatus includes a pixel island configured to emit first light, and a combined micro lens disposed at a light exit side of the pixel island. The combined micro lens includes an additional micro lens configured to diverge the first light emitted by the pixel island; and a first micro lens disposed at a side of the additional micro lens away from the pixel island, and configured to collimate light passed through the additional micro lens. The pixel island is disposed on a focal plane of the combined micro lens.

In some embodiments, the near-eye display apparatus further includes a base having a first surface and a second surface opposite to the first surface. The additional micro lens includes a plurality of second micro lenses, the first micro lens is a protrusion formed in the first surface of the base, and each second micro lens is a groove formed in the second surface of the base.

In some embodiments, a radius of curvature of each second micro lens is less than a radius of curvature of the first micro lens, and a diameter of a maximum section of the second micro lens perpendicular to its optical axis is less than a diameter of a maximum section of the first micro lens perpendicular to its optical axis.

In some embodiments, the plurality of second micro lenses are symmetrically or substantially symmetrically arranged with respect to a sight line axis of the first micro lens.

In some embodiments, the diameter of the maximum section of the first micro lens perpendicular to its optical axis is in a range of approximately 0.7 mm to approximately 1.0 mm, and the diameter of the maximum section of the second micro lens perpendicular to its optical axis is approximately 10% to approximately 50% of the diameter of the maximum section of the first micro lens perpendicular to its optical axis.

In some embodiments, the near-eye display apparatus further includes a planarization layer. The planarization layer is disposed on the second surface of the base and covers the second surface of the base, the pixel island is disposed on a surface of the planarization layer facing away from the base, and a refractive index of the planarization layer is less than a refractive index of the base.

In some embodiments, the refractive index of the base is in a range of approximately 1.5 to approximately 1.7, and the refractive index of the planarization layer is in a range of approximately 1.0 to approximately 1.3.

In some embodiments, the near-eye display apparatus further includes a base having a first surface and a second surface opposite to the first surface, an auxiliary planarization layer disposed on the second surface of the base, and an auxiliary base disposed on a surface of the auxiliary planarization layer facing away from the base. The first micro lens is disposed at the first surface, the additional micro lens is a groove formed in a surface of the auxiliary base facing the base, and a center of the pixel island is on a sight line axis of the first micro lens.

In some embodiments, the near-eye display apparatus further includes a planarization layer disposed on a surface of the auxiliary base facing away from the base. The pixel island is disposed on a surface of the planarization layer facing away from the base, and a refractive index of the planarization layer and a refractive index of the auxiliary planarization layer are less than a refractive index of the auxiliary base formed with the additional micro lens.

In some embodiments, the first micro lens is a protrusion formed in the first surface of the base.

In some embodiments, a diameter of a maximum section of the additional micro lens perpendicular to its optical axis is equal to a diameter of a maximum section of the first micro lens perpendicular to its optical axis.

In some embodiments, the near-eye display apparatus further includes an auxiliary combined micro lens disposed between two adjacent combined micro lenses, and an auxiliary pixel island configured to emit second light and disposed between two adjacent pixel islands. The auxiliary pixel island is disposed on a focal plane of the auxiliary combined micro lens. The combined micro lens is configured to receive the first light emitted by the pixel island and collimate the first light, and the auxiliary combined micro lens is configured to receive the second light emitted by the auxiliary pixel island and collimate the second light, and a range of an angle between light passed through the combined micro lens and a direction perpendicular to a plane where the auxiliary pixel island and the two adjacent pixel islands are located at least partially overlaps with a range of an angle between light passed through the auxiliary combined micro lens and the direction perpendicular to the plane where the auxiliary pixel island and the two adjacent pixel islands are located.

In some embodiments, the auxiliary combined micro lens includes an auxiliary additional micro lens disposed between two adjacent additional micro lenses and configured to diverge the second light emitted by the auxiliary pixel island, and an auxiliary first micro lens disposed between two adjacent first micro lenses and configured to collimate light passed through the auxiliary additional micro lens. The auxiliary additional micro lens and the additional micro lens are same micro lenses, and the auxiliary first micro lens and the first micro lens are same micros.

In some embodiments, the near-eye display apparatus further includes a base having a first surface and a second surface opposite to the first surface, and a planarization layer disposed on and covering the second surface of base. The auxiliary first micro lens and the first micro lens are protrusions formed in the first surface of the base, the auxiliary additional micro lens includes a plurality of auxiliary second micro lenses, the additional micro lens includes a plurality of second micro lenses, and each auxiliary second micro lens and each the second micro lens are grooves formed in the second surface of the base. The pixel island and the auxiliary pixel island are arranged on a surface of the planarization layer facing away from the base, and a refractive index of the planarization layer is less than a refractive index of the base. Each auxiliary second micro lens and each second micro lens are same micro lenses; a radius of curvature of each second micro lens is less than a radius of curvature of the first micro lens, and a diameter of a maximum section of each second micro lens perpendicular to its optical axis is less than a diameter of a maximum section of the first micro lens perpendicular to its optical axis; and a radius of curvature of each auxiliary second micro lens is less than a radius of curvature of the auxiliary first micro lens, and a diameter of a maximum section of each auxiliary second micro lens perpendicular to its optical axis is less than a diameter of a maximum section of the auxiliary first micro lens perpendicular to its optical axis.

In some embodiments, the near-eye display apparatus further includes a base having a first surface and a second surface opposite to the first surface, an auxiliary planarization layer disposed on the second surface of the base, and an auxiliary base disposed on a surface of the auxiliary planarization layer facing away from the base. The first micro lens and the auxiliary first micro lens are protrusions formed in the first surface of the base. The additional micro lens and the auxiliary additional micro lens each are a groove formed in a surface of the auxiliary base facing the base; and a center of the pixel island is on a sight line axis of the first micro lens, and a center of the auxiliary pixel island is on a sight line axis of the auxiliary first micro lens.

In some embodiments, the near-eye display apparatus further includes a planarization layer disposed on a surface of the auxiliary base facing away from the base. The pixel island and the auxiliary pixel island are disposed on a surface of the planarization layer facing away from the base; a refractive index of the planarization layer and a refractive index of the auxiliary planarization layer are less than a refractive index of the auxiliary base formed with the additional micro lens and the auxiliary additional micro lens; and a diameter of a maximum section of the additional micro lens perpendicular to its optical axis is equal to a diameter of a maximum section of the first micro lens perpendicular to its optical axis, and a diameter of a maximum section of the auxiliary additional micro lens perpendicular to its optical axis is equal to a diameter of a maximum section of the auxiliary first micro lens perpendicular to its optical axis.

Some embodiments of the present disclosure provide a virtual/augmented reality system including any near-eye display apparatus as described above.

BRIEF DESCRIPTION OF THE DRAWINGS

In order to describe the technical solutions in the embodiments of the present disclosure more clearly, accompany drawings to be used in the description of some embodiments of the present disclosure will be introduced briefly. Obviously, the accompanying drawings to be described below are merely accompanying drawings of some embodiments of the present disclosure, and a person of ordinary skill in the art can obtain other drawings according to these drawings.

Figure 1:
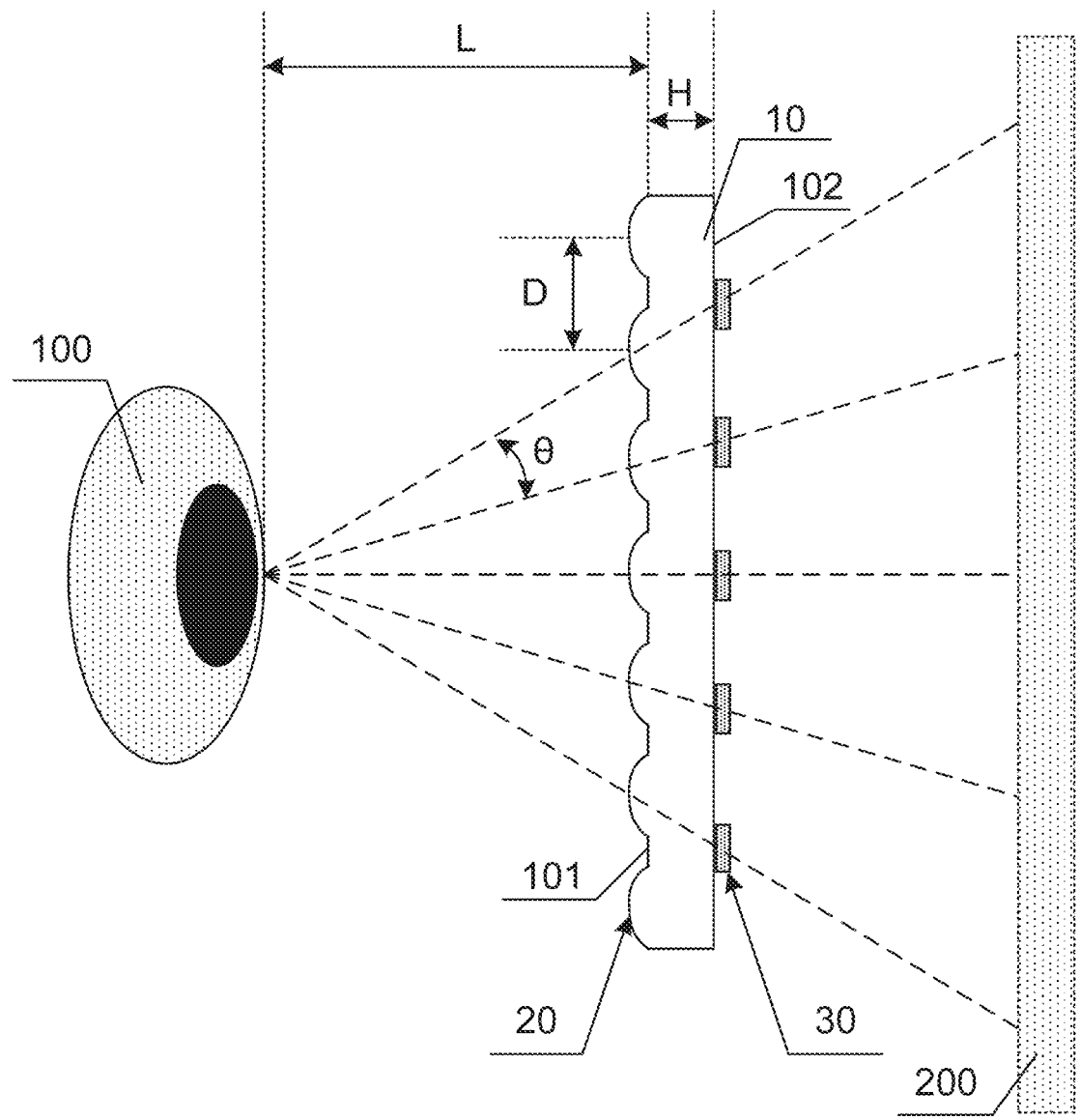
FIG. 1 is a schematic structural diagram of a near-eye display apparatus.

Exemplary embodiments are described herein with reference to cross-sectional views and/or plan views serving as idealized and exemplary drawings. In the drawings, various components may be enlarged for clarity. Therefore, changes in shape relative to the drawings due to, for example, manufacturing technologies and/or tolerances may be envisaged. Therefore, the exemplary embodiments should not be construed as being limited to the shapes of regions shown herein, but including, for example, deviations of shapes caused by manufacturing. Therefore, the components as shown in the drawings are essentially schematic, and their shapes are not intended to show the shapes of the actual components, and are not intended to limit the scope of the exemplary embodiments.

DETAILED DESCRIPTION

The present disclosure will be described below in further detail with reference to accompanying drawings and embodiments. The following embodiments are used for illustrating the present disclosure, but not for limiting the scope of the present disclosure. It will be noted that the embodiments of the present disclosure and the features in the embodiments can be combined with another randomly without conflict.

Unless the context requires otherwise, throughout the specification and claims which follow, the term "comprise", "include" and variations thereof, such as, "comprises", "comprising", "includes" and "including" are to be construed in an open, inclusive sense, i.e., "including, but not limited to". In the description, the terms "one embodiment", "some embodiments", "exemplary embodiments", "example", "specific example" or "some examples", etc. are intended to indicate that particular features, structures, materials or characteristics related to the embodiment(s) or the example(s) are included in at least one embodiment or example of the present disclosure. The schematic representations of the terms are not necessarily referring to the same embodiment or example. In addition, the specific features, structures, materials or characteristics may be included in any one or a plurality of embodiments or examples in any proper manners.

The terms "one or more" or "at least one" used herein, at least partially depending on the context, may be used for describing any characteristic, structure or feature in singular meaning, or may be used for describing a characteristic, structure or feature in plural meaning. At least partially based on the context, the terms such as "a", "an" and "the" will be understood in the singular sense or in the plural sense.

The terms "first" and "second" are merely used for describing purpose, but may not be understood to indicate or imply the relative importance or implicitly indicate the number of the indicated technical features. Thus, the features defined by "first" and "second" may explicitly or implicitly include one or more features.

The traditional near-eye display apparatus typically includes a micro display and a single lens. Due to the level of the existing process, a resolution of the micro display is difficult to increase. Due to a limitation of a diameter of the single lens, the near-eye display apparatus has a large volume and a heavy weight, which is difficult to meet the lightening and thinning requirement. With regard to this problem, a related near-eye display apparatus combining a micro lens array and a pixel island array is proposed, which uses the image-stitching near-eye display technology to achieve image display, but the resolution of the near-eye display apparatus is low, and thus its applicability is poor.

Figure 2:
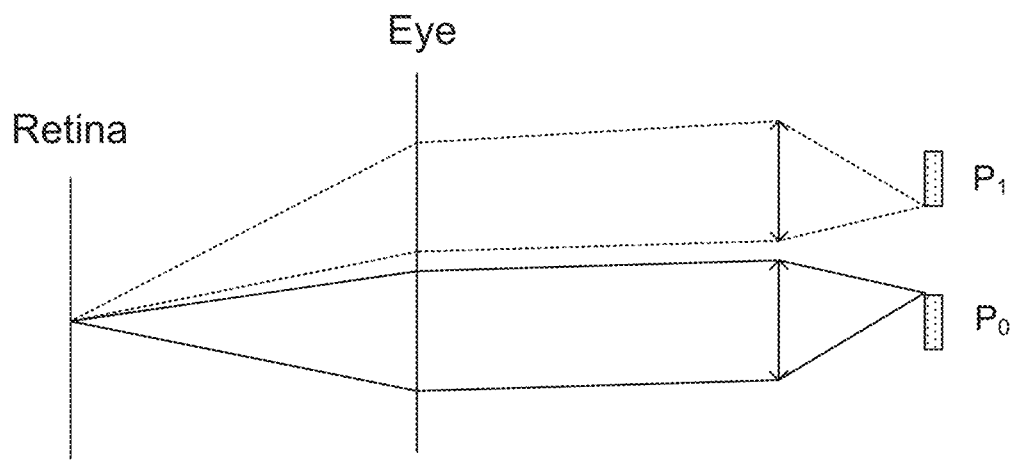
FIG. 2 is a diagram showing a principle of near-eye display adopting field-of-view stitching.

FIG. 1 is a schematic structural diagram of the related near-eye display apparatus, and FIG. 2 is a diagram showing a principle of near-eye display adopting field-of-view stitching. The field-of-view stitching may be realized by utilizing a combination of the micro lens array and the pixel island array to achieve the image-stitching near-eye display.

As shown in FIG. 1, the image-stitching near-eye display apparatus mainly includes a base 10, a micro lens array 20 and a pixel island array 30. The micro lens array 20 is formed in a first surface 101 of the base 10 and the pixel island array 30 is arranged on a second surface 102 of the base 10 opposite to the first surface 101. The micro lens array 20 includes a plurality of micro lenses, and the pixel island array 30 includes a plurality of pixel islands. Each pixel island corresponds to a respective one of the plurality of micro lenses, and the pixel island is located on a focal plane of the respective one of the plurality of micro lenses.

Each pixel island is equivalent to a tiny display screen, and with respect to a complete image to be viewed by a viewer, the pixel island only displays a part of the complete image. As shown in FIG. 1, light emitted by the pixel island enters the viewer's eye 100 after passing through the micro lens. Since the pixel island is disposed on a focal plane of the micro lens, the eye 100 will see an enlarged virtual image corresponding to the image displayed by the pixel island at a certain position in front of the eye 100. The enlarged virtual image is located at a side of the base 10 away from the eye 100. By designing positions of the pixel islands and the micro lenses, virtual images corresponding to all images displayed by the pixel islands may be located in a same plane. In this way, all virtual images may join together to constitute a complete virtual image 200 in the same plane, thus realizing filed-of-view stitching.

It will be noted that during realizing field-of-view stitching, light rays emitted from the closest edges of two adjacent pixel islands enter an eye at a same angle, and the angle refers to an angle between the light and a line perpendicular to a plane where the pixel islands locates (i.e., a horizontal line in FIG. 2). As shown in FIG. 2, with respect to the adjacent pixel island $P_0$ and $P_1$, light rays emitted from the upper edge of the pixel island $P_0$ and light rays emitted from the lower edge of the pixel island $P_1$ are collimated by respective micro lenses into first parallel light rays and second parallel light rays respectively, and an angle of the first parallel light rays entering the eye is equal to an angle of the second parallel light rays entering the eye. With respect to some of the plurality of micro lenses and some of the plurality of pixel islands, if the pixel islands emit light rays with a certain angle (such as 0°) and the light rays can enter the eye, the light rays, for the eye, will create a same virtual image (such as a virtual image at infinite corresponding to a 0° view angle).

The pixel island may include a plurality of sub-pixels. In the case where the display is achieved by field-of-view stitching, an angular resolution α of the eye is introduced to indicate the resolution of the field-of-view stitching display, and the angular resolution α is equivalent to an angle between two lines respectively connecting an upper edge and a lower edge of each sub-pixel to the center of the eye. The smaller the angular resolution α is, the stronger the resolution ability is and the higher the resolution of the near-eye display apparatus is. As shown in FIG. 1, a minimum distance from the eye to the first surface 101 of the base 10 (also called eye relief) in a thickness direction of the base 10 is L, a distance from a surface of the base 10 in which the micro lenses are located to a light exit surface of the pixel island (also known as a placing height) in the thickness direction of the base 10 is H, a center-to-center distance between two adjacent micro lenses is D, a size of the pixel island is m*m (i.e., the pixel island is in a shape of a rectangle and the side lengths of the rectangle are all m), and the number of sub-pixels included in the pixel island is n*n (i.e., the sub-pixels are arranged in an array, and the number of the sub-pixels in each of the row direction and the column direction is n). The angular resolution α satisfies:

$$\alpha = 2 \times \arctan\left(\frac{m}{2n(L+H)}\right).$$

From the angular resolution equation, it can be seen that the resolution of the field-of-view stitching display is related to a size of the sub-pixel (i.e., a quotient of m and n), the placing height H and the eye relief L. In order to improve the resolution of the field-of-view stitching display, the following methods are generally adopted.

The first method: the number of the sub-pixels is increased under a condition that the size of the pixel island is unchanged, that is, the pixel island with a same size includes more sub-pixels. However, due to a limitation of existing manufacturing processes, Pixels Per Inch (PPI) of a display panel cannot be increased by orders of magnitude in a short time, and thus the method of increasing the resolution of the near-eye display apparatus by increasing the PPI of the display panel is greatly limited.

The second method: the placing height H is increased. Increasing the placing height H may reduce the magnification of the micro lens, thereby improving the imaging ability of the micro lens. However, increasing the placing height H will cause an increase of the thickness of the near-eye display apparatus, which is contrary to a development direction of a thin near-eye display apparatus, so the placing height H cannot be too large.

The third method: the eye relief L is increased. However, since the near-eye display apparatus is limited by the application situation, the eye relief L is generally set to 18 mm to 30 mm. The eye relief L cannot be too large, otherwise it is not conducive to the viewer to view, and the near-eye display apparatus will lose its use value.

In addition, considering the imaging ability of the micro lens and the requirement for the thin near-eye display apparatus with a small placing height H, the magnification of the micro lens is large, which causes that only sub-pixels located at a center of the pixel island is included in an effective field-of-view and sub-pixels located at an edge of the pixel island are not effectively utilized. Finally, the resolution of the near-eye display apparatus is low, and the applicability of the near-eye display apparatus is poor.

Some embodiments of the present disclosure provide a near-eye display apparatus 1. As shown in FIG. 3B and FIG. 4, the near-eye display apparatus 1 includes a pixel island 300 configured to emit first light 310, and a combined micro lens 401 disposed at a light exit side of the pixel island 300. As shown in FIG. 4, the combined micro lens 401 includes a first micro lens 41 and an additional micro lens. The additional micro lens is configured to diverge the first light 310 emitted by the pixel island 300. The first micro lens 41 is disposed at a side of the additional micro lens away from the pixel island 300, and is configured to collimate light passed through the additional micro lens. The pixel island 300 is disposed on a focal plane of the combined micro lens 401.

It will be noted that, as shown in FIG. 3B, the near-eye display apparatus 1 may include a plurality of pixel islands 300 that may be arranged in an array and a plurality of combined micro lenses 401 that may be arranged in an array, which can arranged in a one-to-one correspondence, however, for ease of description, only one pixel island and one combined micro lens are taken as an example to describe the structure of the near-eye display apparatus 1.

Herein, the first light 310 emitted by the pixel island 300 is diverged by the additional micro lens. The additional micro lens includes, for example, at least one concave lens or diverging superlens, but it is not limited thereto, as long as it can achieve the above function. The light passed through the additional micro lens is collimated by the first micro lens 41. The first micro lens 41 is, for example, a convex lens, a converging superlens, but it is not limited thereto, as long as it can achieve the above function.

The focal plane of the combined micro lens 401 refers to a plane that is perpendicular to an optical axis of the combined micro lens and includes a focal point of the combined micro lens. In the embodiments, the combined micro lens 401 is disposed at the light exit side of the pixel island 300, so the focal plane on which the pixel island 300 is disposed is located at a side of the combined micro lens 401 receiving the first light 310.

In some examples, the pixel island 300 may include a plurality of sub-pixels. The sub-pixel may include an OLED (organic light emitting diode), a micro-LED, etc. In some examples, the pixel island is in a shape of a square, and a side length of the pixel island is in a range of approximately 0.4 mm to approximately 1.0 mm, such as 0.4 mm, 0.5 mm, 0.8 mm or 1.0 mm.

Herein, the pixel island 300 may be a display element provided separately, or may be a portion of a display panel, but it is not limited thereto, as long as it can achieve the required display function.

In the near-eye display apparatus provided by the embodiments, the additional micro lens in the combined micro lens may converge the light, and thus the sub-pixels located at the edge of the pixel island may be included in the effective field-of-view, which is equivalent to increasing the number of the sub-pixels in a view angle corresponding to each combined micro lens. In this way, the resolution of the near-eye display apparatus may be improved in a case where the placing height H is not changed, that is, in a case where the near-eye display apparatus meets the requirement on the thickness.

Figure 3A:
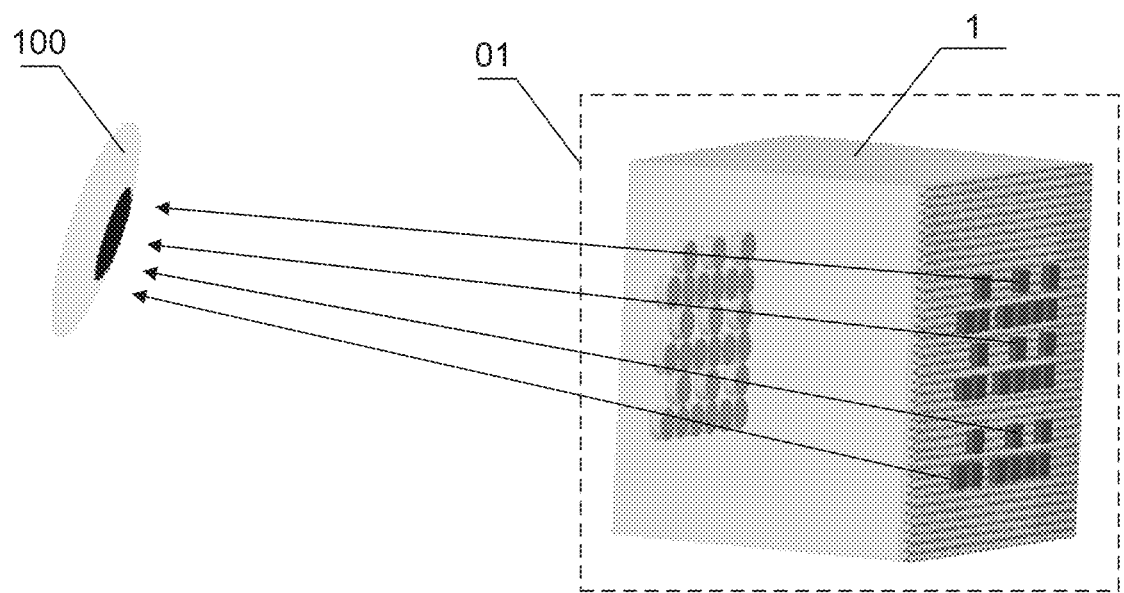
FIG. 3A is a perspective diagram of a near-eye display apparatus, in accordance with some embodiments.
Figure 3B:
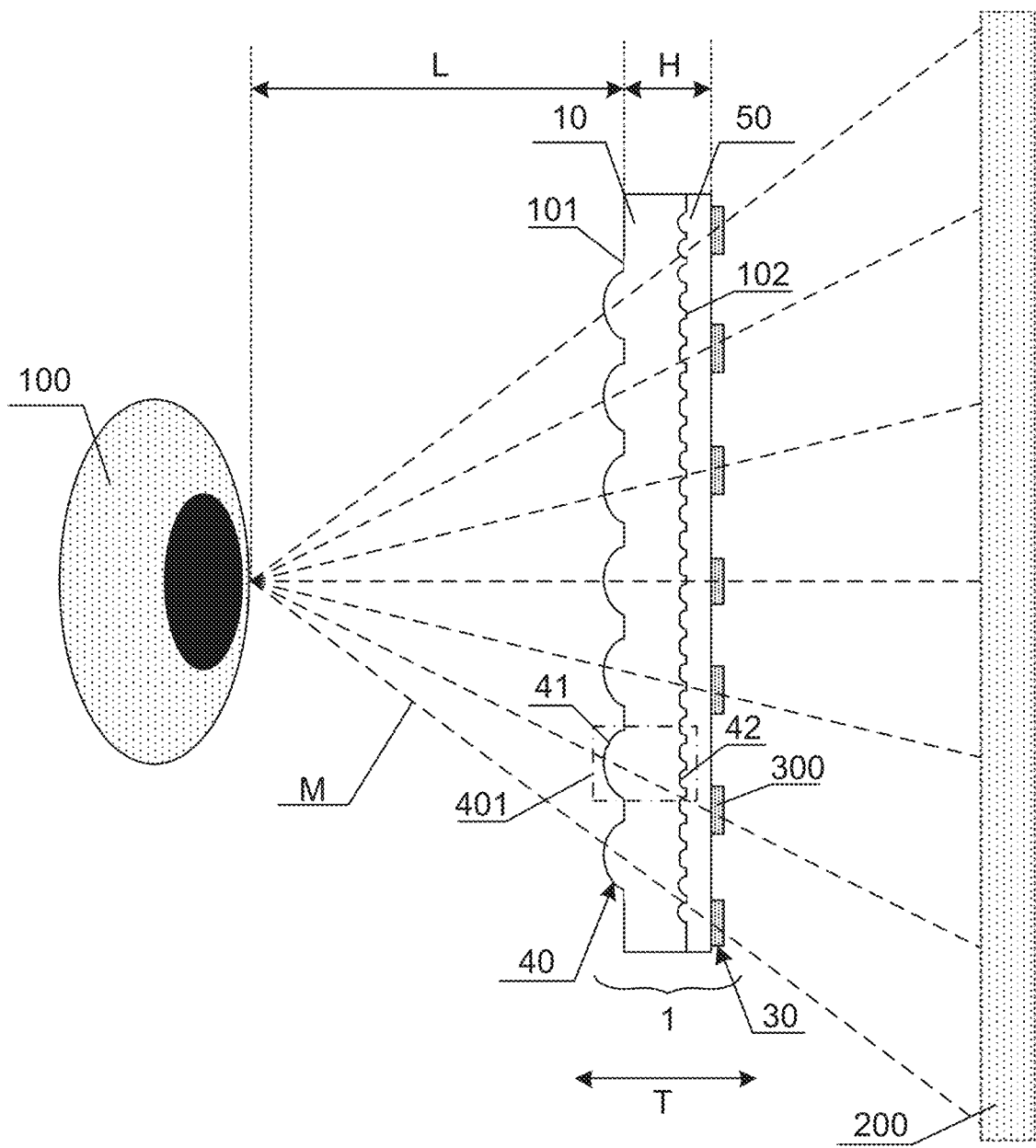
FIG. 3B is a structural diagram of a near-eye display apparatus, in accordance with some embodiments.
Figure 4:
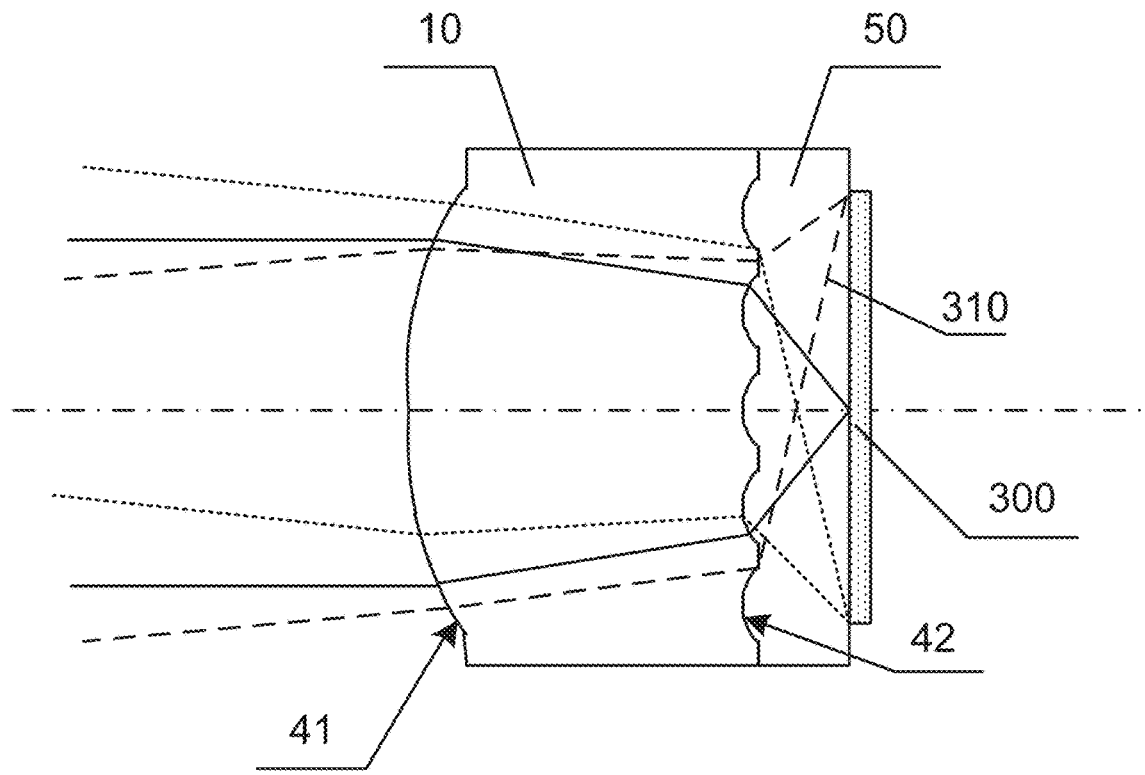
FIG. 4 is a schematic diagram of a part of a near-eye display apparatus, in accordance with some embodiments.

In some embodiments, as shown in FIG. 3A and FIG. 3B, the near-eye display apparatus 1 further includes a base 10 having a first surface 101 and a second surface 102 opposite to the first surface 101. The additional micro lens includes a plurality of second micro lenses 42. The first micro lens 41 is a protrusion formed in the first surface 101 of the base 10, and the second micro lens 42 is a groove formed in the second surface 102 of the base 10.

The first micro lens 41 and the second micro lenses 42 may be integrally formed with the base 10, so that a manufacturing process of the combined micro lens may be simplified. Or, the first micro lens 41, the second micro lenses 42 and the base 10 may be manufactured separately and then the first micro lens 41 and the second micro lenses 42 may be bonded to the base 10 to form the combined micro lens 401. The structure and manufacturing process of the combined micro lens are not limited thereto, as long as the combined micro lens can achieve its function described above.

For example, the near-eye display apparatus, as shown in FIG. 3B, includes a base 10, a combined micro lens array 40 disposed in the base 10 and a pixel island array 30 located at a side of the base 10 away from the eye 100. The combined micro lens array 40 includes a plurality of combined micro lenses 401 spaced apart from each other, and the pixel island array 30 includes a plurality of pixel islands 300 spaced apart from each other. Each pixel island 300 corresponds to a respective one of the combined micro lenses 401, and is disposed on the focal plane of the respective one of the combined micro lenses 401. The combined micro lens 401 includes a first micro lens 41 disposed in a surface of the base 10 facing the eye 100, and second micro lenses disposed in an opposite surface of the base 10.

The pixel island array 30 is used to display images and includes a plurality of pixel islands 300 spaced apart from each other. A region between any two adjacent pixel islands 300 is a transparent region of the near-eye display apparatus 1, through which external light may pass. With respect to a complete image to be viewed by a viewer, each pixel island 300 only displays a part of the complete image. An image displayed by each pixel island 300 is converted into an enlarged virtual image by the combined micro lens 401, and the virtual images may join together to constitute a complete virtual image 200, i.e., form the complete image to be viewed by the viewer. By designing a distance between the eye 100 and the first surface 101 (i.e., the eye relief L) as well as a distance between the first surface 101 and the light exit surface of the pixel island 300 (i.e., the placing height H), a continuously enlarged virtual image located at a certain position at a side of the combined micro lens 401 away from the eye 100 may be obtained.

The base 10 is made of a transparent material, such as glass, ceramic, or quartz, and may also be made of a silicon-containing compound, such as silicon nitride ($Si_3N_4$). In some examples, in order to reduce a weight of the entire near-eye display apparatus, the base 10 is made of a light-weight transparent material, such as polymethyl methacrylate (PMMA) (also known as acrylic or perspex).

Figure 6:
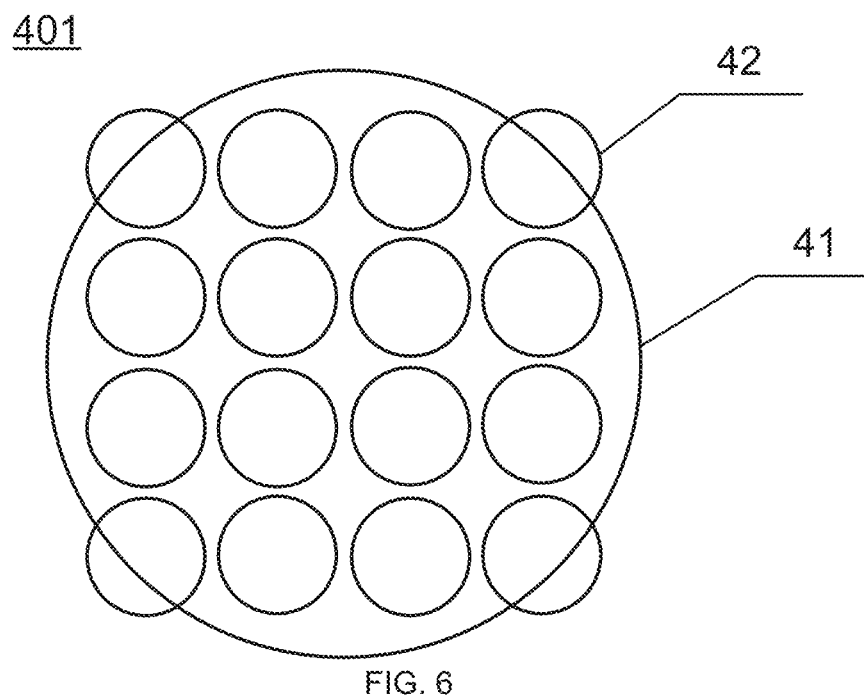
FIG. 6 is a diagram showing a corresponding relationship among micro lenses of a combined micro lens, in accordance with some embodiments.

In some embodiments, as shown in FIG. 3B and FIG. 4, the additional micro lens includes a plurality of second micro lenses 42. A radius of curvature of each second micro lens 42 is less than a radius of curvature of the first micro lens 41. As shown in FIG. 6, a diameter of a maximum section of each second micro lens 42 perpendicular to its optical axis is less than a diameter of a maximum section of the first micro lens 41 perpendicular to its optical axis. As shown in FIG. 4, the diameter of the maximum section of the second micro lens 42 perpendicular to its optical axis is, for example, a diameter of an opening of the second micro lens 42 (i.e., the groove), and the diameter of the maximum section of the first micro lens 41 perpendicular to its optical axis is, for example, a distance between the upper edge and the lower edge of the first micro lens 41 in FIG. 4.

The optical axis refers to the straight line passing through the geometrical center of a lens and joining the two centers of curvature of its surfaces. In a case where one of two surfaces of the lens is a plane, the optical axis is a straight line passing through the geometrical center of the lens and joining a center of plane and a center of curvature of the other surface.

In some embodiments, as shown in FIG. 6, the plurality of second micro lenses 42 are symmetrically or approximately symmetrically arranged with respect to a sight line axis of the first micro lens 41 to diverge light emitted by the pixel island 300.

As shown in FIG. 3B, a center of the eye 100, a center of each first micro lens 41 and a center of a corresponding pixel island 300 are on a straight line, and the straight line is called a sight line axis M of the first micro lens 41. With respect to the designed near-eye display apparatus, the distance from the center of the eye 100 to the center of the first micro lens 41 (i.e., the eye relief L) in a thickness direction T of the near-eye display apparatus shown in FIG. 3B is fixed, so the sight line axis M of the first micro lens 41 is a determinate straight line.

In some embodiments, the diameter of the maximum section of the first micro lens 41 perpendicular to its optical axis is in a range of approximately 0.7 mm to approximately 1.0 mm, such as 0.7 mm, 0.85 mm or 1.0 mm, and the diameter of the maximum section of the second micro lens 42 perpendicular to its optical axis is approximately 10% to approximately 50% of the diameter of the maximum section of the first micro lens 41 perpendicular to its optical axis. In some examples, the diameter of the maximum section of the second micro lens 42 perpendicular to its optical axis is approximately 25% of the diameter of the maximum section of the first micro lens 41 perpendicular to its optical axis. As shown in FIG. 6, the combined micro lens includes one first micro lens 41 and sixteen second micro lenses 42.

In some embodiments, as shown in FIG. 3B and FIG. 4, the near-eye display apparatus 1 further includes a planarization layer 50. The planarization layer 50 is disposed on the second surface 102 of the base 10 and covers the second surface 102 of the base 10. The pixel island 300 is disposed on a surface of the planarization layer 50 facing away from the base 10, and a refractive index of the planarization layer 50 is less than a refractive index of the base 10.

The planarization layer 50 covers the second micro lenses 42 formed in the second surface 102 to form a flat surface, thus facilitating an arrangement of the pixel islands 300 on the planarization layer 50 and adjusting a distance between the pixel islands 300 and the combined micro lenses 401. The pixel island 300 needs to be arranged on a focal plane of a corresponding combined micro lens 401, but a thickness of the base 10 is probably not equal to a focal distance of the combined micro lens 401. However, the sum of the thickness of the base 10 and a thickness of the planarization layer 50 may be equal to the focal distance of the combined micro lens 401 by adjusting the thickness of the planarization layer 50. That is, the surface of the planarization layer 50 facing away from the base 10 is the focal plane of the combined micro lens 401.

In some embodiments, the refractive index of the base is in a range of approximately 1.5 to approximately 1.7, such as 1.5, 1.55, 1.65 or 1.7, and the refractive index of the planarization layer 50 is in a range of approximately 1.0 to approximately 1.3, such as 1.0, 1.2 or 1.25.

The planarization layer 50 is made of a transparent material, and the transparent material may be an organic material with a low refractive index (which is close to the refractive index of air). Materials of the base 10 and the planarization layer 50 may be selected according to actual requirements, which are not limited thereto.

FIG. 4 schematically illustrates a working principle of the combined micro lens 401 including a plurality of second micro lenses 42 in accordance with some embodiments. Light emitted by the pixel island 300 is diverged by the second micro lens 42 and then collimated by the first micro lens 41 to enter an eye.

Figure 5:
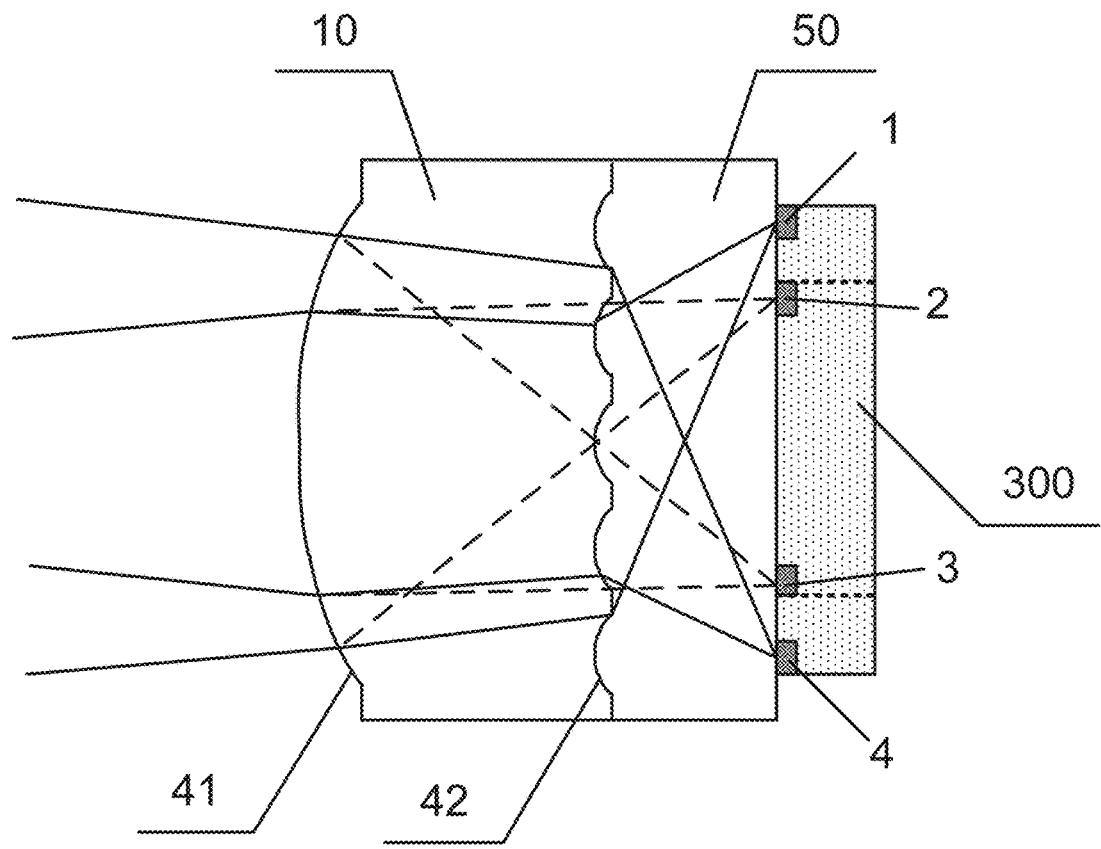
FIG. 5 is a comparison diagram of optical paths of light through a near-eye display apparatus in accordance with some embodiments and optical paths of light through a related near-eye display apparatus.

FIG. 5 is a comparison diagram of optical paths for the near-eye display apparatus in accordance with some embodiments and optical paths for the related near-eye display apparatus. In a case where the second micro lens 42 is not provided, light emitted by a second sub-pixel 2 in the pixel island 300 (the light is shown by dotted lines in FIG. 5) is collimated by the first micro lens 41, and then enters the eyes in parallel at a first angle. However, since a magnification of the first micro lens 41 is too large, light emitted by a first sub-pixel 1 that is closer to an edge of the pixel island 300 than the second sub-pixel 2 is out of the range of field-of-view of the eye after passing through the first micro lens 41 and thus cannot enter the eye, that is, sub-pixels close to the edge of the pixel island 300 may not be included in the effective field-of-view and may not be utilized.

In the embodiments of the present disclosure, as shown in FIG. 5, light emitted by the first sub-pixel 1 in the pixel island 300 (the light is shown by solid lines in FIG. 5) is diverged by the second micro lens 42 and then is collimated by the first micro lens 41 to enter the eye at the same first angle. In this way, a wider range of imaging of the pixel island 300 may be realized at the same field-of-view by providing the second micro lens 42.

A dotted line range of the pixel island 300 as shown in FIG. 5 is an imaging range of the pixel island 300 in a case where the second micro lens is not provided, and a solid line range is an actual imaging range of the pixel island 300 after the second micro lenses 42 are provided. An increase of the actual imaging range allows a region of the pixel island 300 used for imaging to include more sub-pixels, thereby improving the resolution of the near-eye display apparatus 1. Similarly, the principle of transmission of light emitted by a third sub-pixel 3 and light emitted by a fourth sub-pixel 4 is the same as that of the first sub-pixel 1 and the second sub-pixel 2.

The optical paths in FIG. 5 are only for illustration, which are used to clearly show the divergence effect of the second micro lens 42 on the light. The actual optical paths may be different from that in FIG. 5, which is not limited thereto.

The view angle θ is defined as an angle between two lines respectively connecting centers of two adjacent pixel islands 300 to the center of the eye (reference may be made to FIG. 1), and is also equal to an angle between two lines respectively connecting an upper edge and a lower edge of each pixel island 300 to the center of the eye. In a case where a size of the pixel island 300 is m*m and the number of the sub-pixels in the pixel island 300 is n*n, an angle between two lines respectively connecting an upper edge and a lower edge of each sub-pixel to the center of the eye (which is equivalent to the angular resolution α) is approximately equal to a product of θ and a quotient of n and m (i.e., θ*n/m). In a case where a view angle θ corresponding to a single lens and the size of the pixel island is fixed, the more the number of the sub-pixels corresponding to the view angle θ is, the higher the angular resolution α is.

In the related near-eye display apparatus, in a case where the pixel island is in a shape of a rectangle and the side lengths of the rectangle are all m, since the magnification of the single micro lens is very large, the side length of the actual imaging range of the pixel island is less than m, and is in a range of approximately 0.6*m to approximately 0.8*m. The actual imaging range is small, so few sub-pixels can be used for imaging. In contrast, in the embodiments of the present disclosure, sub-pixels proximate to the edge of the pixel island 300 may be included in the effective field-of-view by providing a combination of the first micro lens 41 and the second micro lenses 42, and the actual imaging range of the pixel island 300 is enlarged, which is equivalent to increasing the size of the pixel island 300. The increase of the size of the pixel island 300 means that the number of the sub-pixels used for imaging is increased, that is, the number of the sub-pixels corresponds to the angle of view of each combined micro lens is increased, so that the resolution of field-of-view stitching display is improved.

It will be known that the view angle is related to the placing height through a simple calculation, and no change of the view angle means no change of the placing height. The resolution of the near-eye display apparatus is improved in a case where the view angle is not changed, that is, the resolution of the near-eye display apparatus is improved in a case where the placing height is not changed. Therefore, the resolution of the near-eye display apparatus provided by some embodiments is improved on the premise of meeting the requirement on the thickness.

Figure 7A:
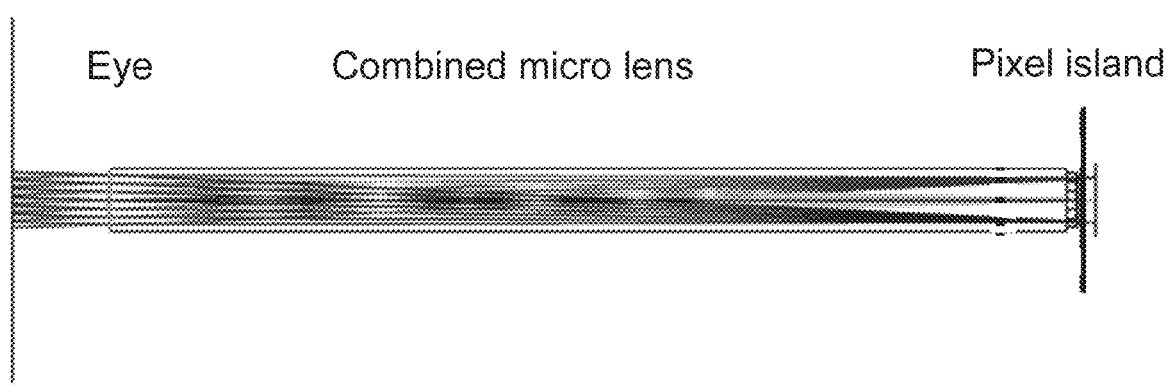
FIG. 7A is a schematic diagram showing a simulation test of a near-eye display apparatus, in accordance with some embodiments.

A simulation test confirms the technical effect of improving the resolution of the near-eye display apparatus 1 provided by some embodiments, which is consistent with a theoretical analysis result. FIG. 7A is a schematic simulation diagram of a combined micro lens in accordance with some embodiments, in which the combined micro lens includes a first micro lens and a plurality of second micro lenses.

Figure 7B:
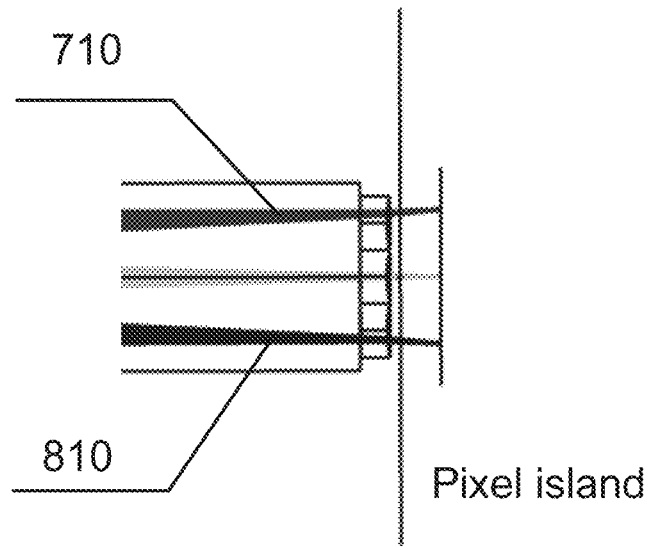
FIG. 7B is a partial enlargement view of the pixel island region in FIG. 7A.

FIG. 7A schematically illustrates a field-of-view corresponding to a single pixel island 300, and FIG. 7B is a partial enlargement view of the pixel island region of FIG. 7A. During the simulation design, a back tracking mode of optical paths is adopted. That is, parallel light is emitted from the position of the eye, and creates an image on a plane where the pixel island is located after the parallel light passes through the combined micro lens. In this way, the position and the size of the pixel island 300 may be obtained accurately. As shown in FIG. 7B, a position of third light 710 traveling to the plane and a position of fourth light 810 traveling to the plane define an edge of the field-of-view. It will be seen from simulation of the field-of-view corresponding to the single pixel island 300 that, by providing the combined micro lens, an imaging point of the third light 710 moves upwards, and an imaging point of the fourth light 810 moves downwards, that is, the actual imaging range of the pixel island 300 is larger.

Figure 8:
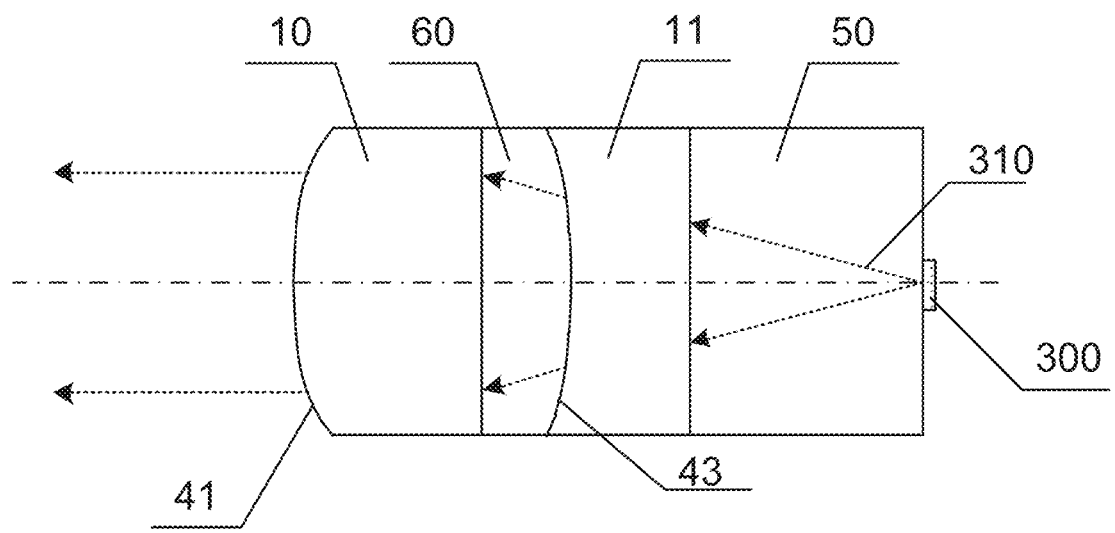
FIG. 8 is a schematic diagram of a part of another near-eye display apparatus, in accordance with some embodiments.

In some embodiments, as shown in FIG. 8, the near-eye display apparatus 1 further includes a base 10 having a first surface 101 and a second surface 102 opposite to the first surface 101, an auxiliary planarization layer 60 disposed on the second surface 102 of the base 10, and an auxiliary base 11 disposed on a surface of the auxiliary planarization layer 60 facing away from the base 10. The first micro lens 41 is disposed at the first surface 101, the additional micro lens is a groove formed in a surface of the auxiliary base 11 facing the base 10, and the center of the pixel island 300 is on the sight line axis M of the first micro lens 41.

It will be noted that the center of the eye, the center of the first micro lens 41, a center of the third micro lens 43 and the center of the pixel island 300 are on a straight line, and the straight line is the sight line axis M of the first micro lens 41.

Each combined micro lens includes the first micro lens 41 and a third micro lens 43 serving as the additional micro lens. As shown in FIG. 8, the third micro lens 43 is disposed between the base 10 and the pixel island 300 and is configured to receive the first light 310 emitted by the pixel island 300 and diverge the first light 310, and the third micro lens 43 may reduce the magnification of the combined micro lens. In addition, the auxiliary planarization layer 60 covers the third micro lens 43 and is used to fill unevenness of the auxiliary base 11 caused by the third micro lens 43, thus facilitating bonding of the auxiliary base 11 and the base 10.

In some examples, the third micro lens 43 is a concave lens. In a case where the third micro lens 43 is a groove formed in the surface of the auxiliary base 11 facing the base 10, the third micro lens 43 may be integrally formed with the auxiliary base 11 to simplify the manufacturing process of the combined micro lens. The third micro lens 43 and the auxiliary base 11 may also be manufactured separately, and then the third micro lens 43 may be bonded to the auxiliary base 11, which is not limited thereto.

The first micro lens 41 is, for example, a protrusion formed in the first surface 101 of the base 10 and is configured to collimate the first light 310 passed through the third micro lens 43. In this case, the first micro lens 41 may be integrally formed with the base 10, thus simplifying the manufacturing process of the combined micro lens. The first micro lens 41 and the base 10 may also be manufactured separately and then the first micro lens 41 is bonded to the base 10, which is not limited thereto.

A material of the auxiliary base 11 may be the same as the material of the base 11, and a material of the auxiliary planarization layer 60 may be the same as the material of the planarization layer 50, which are not described herein again.

A formula of a lens is: $1/r'+1/r=1/f$, where f is a focal distance, r is an object distance (i.e., the placing height H) and r' is an image distance. The magnification β of the micro lens is equal to the quotient of r' and r (i.e., r'/r). In a case where the image distance r' is fixed, if the focal distance f increases (that is, the object distance r increases), the magnification β will decrease. The lower the magnification is, the lower the requirement on the imaging ability of the micro lens is. As a result, higher imaging quality may be realized at the same view angle.

In some embodiments, the magnification of the combined micro lens is reduced by utilizing a diverging function of the concave lens, so that the sub-pixels located at the edge of the pixel island 300 may be included in the effective field-of-view, and the actual imaging range of the pixel island 300 is enlarged, which is equivalent to increasing the size of the pixel island 300 (that is, the number of the sub-pixels used for imaging is increased). That is, the number of the sub-pixels in the view angle corresponding to each combined micro lens is increased, so that the resolution of field-of-view stitching display is improved. In this way, the resolution of the near-eye display apparatus is improved in a case where the view angle is not changed, that is, the resolution of the near-eye display apparatus is improved in a case where the placing height is not changed, which also achieves an increase of the resolution of the near-eye display apparatus on the premise of meeting the requirement on the thickness.

In some embodiments, as shown in FIG. 8, the near-eye display apparatus 1 further includes a planarization layer 50 disposed on a surface of the auxiliary base 11 facing away from the base 10. The pixel island 300 is disposed on the surface of the planarization layer 50 facing away from the base 10, and the refractive index of the planarization layer 50 and a refractive index of the auxiliary planarization layer 60 are less than a refractive index of the auxiliary base 11 formed with the third micro lens 43. The planarization layer may facilitate the bonding of the pixel island 300 and the auxiliary base 11 and adjust a thickness of the near-eye display apparatus.

In some embodiments, the first micro lens 41 and the third micro lens 43 have the same diameter of their respective maximum section respectively perpendicular to their respective optical axis, which is in a range of approximately 0.7 mm to approximately 1.0 mm, such as 0.7 mm, 0.85 mm or 1.0 mm. For example, a positive lens and a negative lens that have the same diameter are used to form the combined micro lens. The radius of curvature of the first micro lens 41 and a radius of curvature of the third micro lens 43 may be determined by the focal distance of the combined micro lens, which is not limited thereto.

The near-eye display apparatus may realize monochromatic display and may also realize chromatic display.

When the monochromatic display is realized, two adjacent pixel islands are responsible for different angles, each of which is an angle between light passed through the combined micro lens and a direction perpendicular to a plane where the pixel islands 300 are located, and seamless field-of-view stitching is realized by utilizing a principle that light entering an eye at the same angle is converged at the same point on a retina, that is, light emitted by the sub-pixels located at the closest edges of two adjacent pixel islands 300 enters the eye at the same angle after passing through the corresponding combined micro lenses, thereby ensuring that image stitching may be realized.

When the chromatic display is realized, pixel islands 300 with three or four colors may be adopted, and light emitted by the sub-pixels in each pixel island 300 has the same color. With respect to sub-pixels that emit light of the same color, the pixel islands 300 have the same size and the corresponding combined micro lenses have the same optical parameters. The pixel islands 300 of different colors and the corresponding combined micro lenses are translated by a proper distance, and color superposition is realized by utilizing the principle that light entering the eye at the same angle is converged at the same point on the retina, thereby realizing the chromatic display.

Figure 9A:
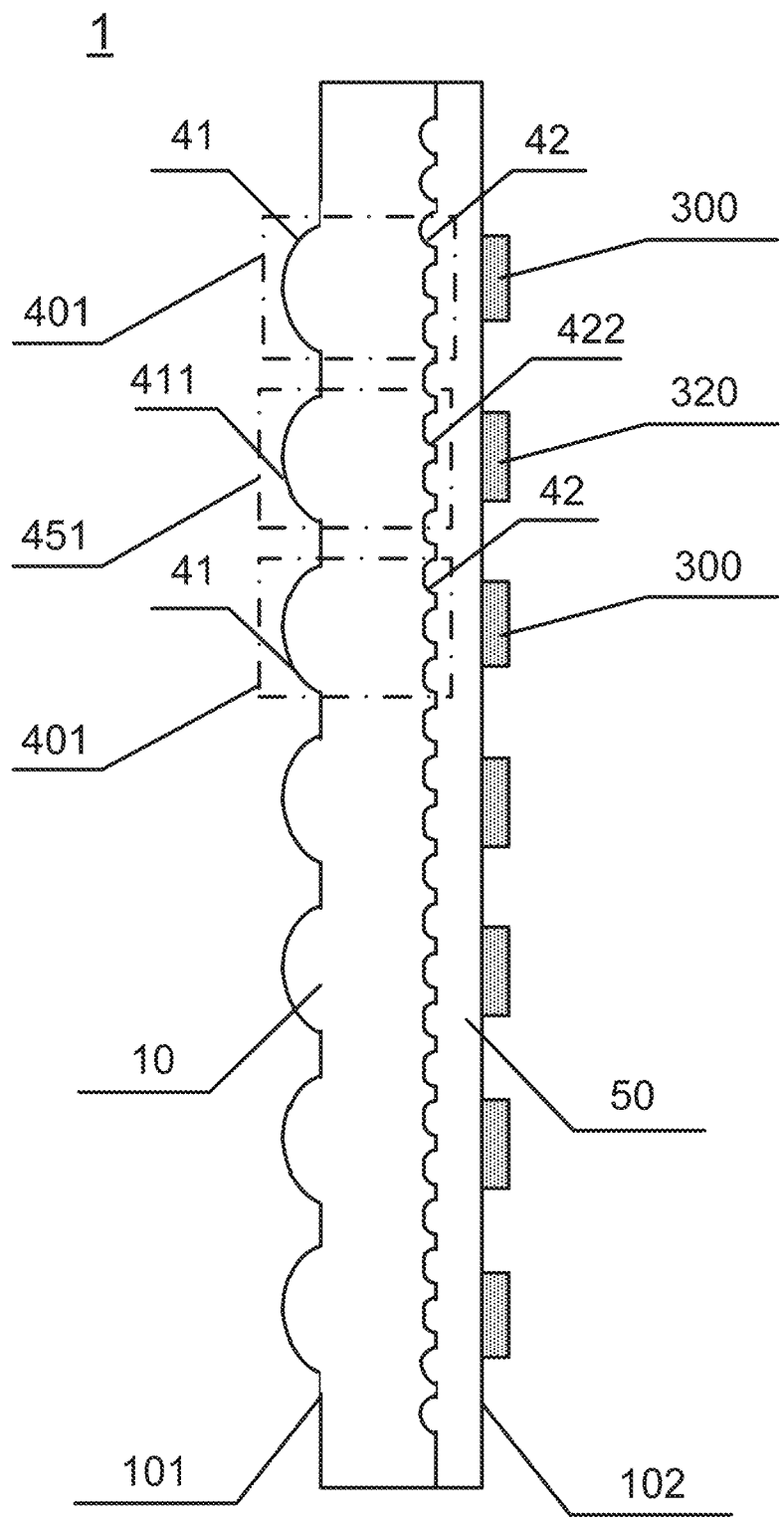
FIG. 9A is a schematic diagram of yet another near-eye display apparatus, in accordance with some embodiments.

In some embodiments, as shown in FIG. 9A, the near-eye display apparatus 1 further includes: an auxiliary combined micro lens 451 disposed between two adjacent combined micro lenses 401, and an auxiliary pixel island 320 disposed between two adjacent pixel islands 300 and configured to emit second light 410. The auxiliary pixel island 320 is disposed on a focal plane of the auxiliary combined micro lens 451. The combined micro lens 401 is configured to receive the first light 310 emitted by the pixel island 300 and collimate the first light 310, and the auxiliary combined micro lens 451 is configured to receive the second light 410 emitted by the auxiliary pixel island 320 and collimate the second light 410. A range of an angle between light passed through the combined micro lens 410 and a direction perpendicular to a plane where the auxiliary pixel island 320 and the two adjacent pixel islands 300 are located at least partially overlaps a range of an angle between light passed through the auxiliary combined micro lens 451 and the direction perpendicular to the plane where the auxiliary pixel island 320 and the two adjacent pixel islands 300 are located.

In some embodiments, as shown in FIG. 9A, the auxiliary combined micro lens 451 includes an auxiliary additional micro lens and an auxiliary first micro lens 411. The auxiliary additional micro lens is disposed between two adjacent additional micro lenses and is configured to diverge the second light 410 emitted by the auxiliary pixel island 320. The auxiliary first micro lens 411 is disposed between two adjacent first micro lenses 41 and is configured to collimate light passed through the auxiliary additional micro lens. The auxiliary additional micro lens and the additional micro lens are same micro lenses, and the auxiliary first micro lens 411 and the first micro lens 41 are same micro lenses. That is, a size and optical parameters of the auxiliary additional micro lens are the same as a size and optical parameters of the additional micro lens, respectively, and a size and optical parameters of the auxiliary first micro lens 411 are the same as a size and optical parameters of the first micro lens 41, respectively.

Herein, the structure and arrangement of the auxiliary combined micro lens 451 are the same as those of the combined micro lens 401, respectively. With respect to the specific structure, reference may be made to the above content, which is not described herein again.

In some embodiments, as shown in FIG. 9A, the near-eye display apparatus 1 further includes a base 10 and a planarization layer 50. The base 10 has a first surface 101 and a second surface 102 opposite to the first surface 101. The planarization layer 50 is disposed on and covers the second surface 102 of the base 10. The auxiliary first micro lens 411 and the first micro lens 41 are protrusions formed in the first surface 101 of the base 10, the auxiliary additional micro lens includes a plurality of auxiliary second micro lenses 422, the additional micro lens includes a plurality of second micro lenses 42, and each auxiliary second micro lens 422 and each second micro lens 42 are grooves formed in the second surface 102 of the base 10. The pixel island 300 and the auxiliary pixel island 320 are disposed on a surface of the planarization layer 50 facing away from the base 10, and the refractive index of the planarization layer 50 is less than the refractive index of the base 10. Each auxiliary second micro lens 422 and each second micro lens 42 are same micro lenses. That is, a size and optical parameters of the auxiliary second micro lens 422 are the same as a size and optical parameters of the second micro lens 42. The radius of curvature of each second micro lens 42 is less than the radius of curvature of the first micro lens 42, and the diameter of a maximum section of each second micro lens 42 perpendicular to its optical axis is less than the diameter of a maximum section of the first micro lens 41 perpendicular to its optical axis. A radius of curvature of each auxiliary second micro lens 422 is less than a radius of curvature of the auxiliary first micro lens 411, and a diameter of a maximum section of each auxiliary second micro lens 422 perpendicular to its optical axis is less than a diameter of a maximum section of the auxiliary first micro lens 411 perpendicular to its optical axis.

Herein, the structure and arrangement of the auxiliary first micro lens 411 are the same as those of the first micro lens 41 respectively, and the structure and arrangement of the auxiliary second micro lens 422 are the same as those of the second micro lens 42 respectively. With respect to the specific structure, reference may be made to the above content, which is not described herein again.

Figure 9B:
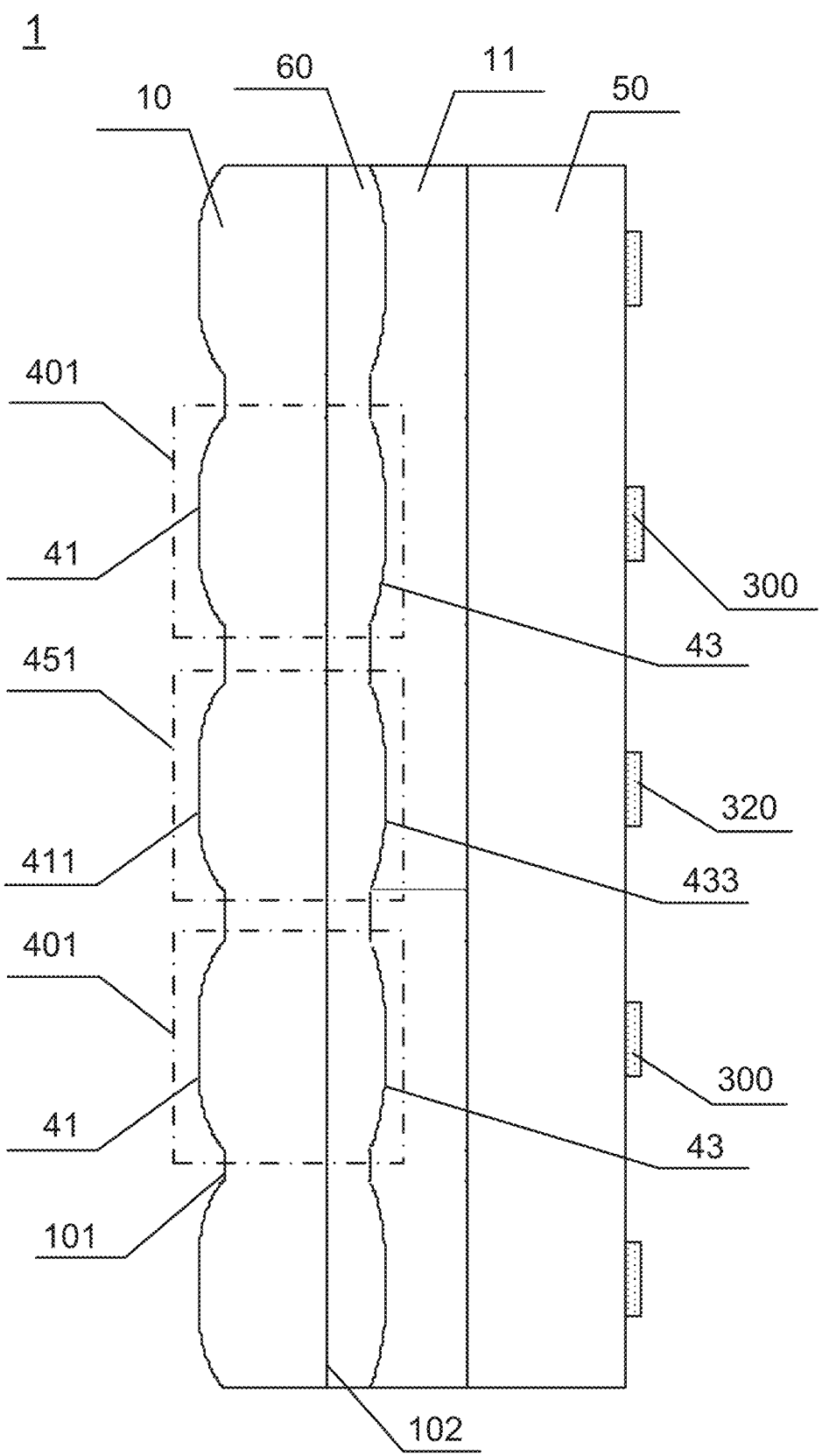
FIG. 9B is a schematic diagram of yet another near-eye display apparatus, in accordance with some embodiments.

In some embodiments, as shown in FIG. 9B, the near-eye display apparatus 1 further includes a base 10, an auxiliary planarization layer 60 and an auxiliary base 11. The base 10 has a first surface 101 and a second surface 102 opposite to the first surface 101; the auxiliary planarization layer 60 is disposed on the second surface 102 of the base 10; and the auxiliary base 11 is disposed on a surface of the auxiliary planarization layer 60 facing away from the base 10. The first micro lens 41 and the auxiliary first micro lens 411 are protrusions formed in the first surface 101 of the base 10, and the third micro lens 43 serving as the additional micro lens and an auxiliary third micro lens 433 serving the auxiliary additional micro lens each are a groove formed in a surface of the auxiliary base 11 facing the base 10. A center of the pixel island 300 is on a sight line axis of the first micro lens 41, and a center of the auxiliary pixel island 320 is on a sight line axis of the auxiliary first micro lens 411.

In some embodiments, as shown in FIG. 9B, the near-eye display apparatus 1 further includes a planarization layer 50 disposed on a surface of the auxiliary base 11 facing away from the base 10. The pixel island 300 and the auxiliary pixel island 320 are disposed on a surface of the planarization layer 50 facing away from the base 10. A refractive index of the planarization layer 50 and a refractive index of the auxiliary planarization layer 60 are less than a refractive index of the auxiliary base 11 formed with the third micro lens 43 and the auxiliary third micro lens 433. A diameter of a maximum section of the third micro lens 43 perpendicular to its optical axis is equal to a diameter of a maximum section of the first micro lens 41 perpendicular to its optical axis, and a diameter of a maximum section of the auxiliary third micro lens 433 perpendicular to its optical axis is equal to a diameter of a maximum section of the auxiliary first micro lens 411 perpendicular to its optical axis.

Herein, the structure and arrangement of the auxiliary first micro lens 411 are the same as those of the first micro lens 41 respectively, and the structure and arrangement of the auxiliary third micro lens 433 are the same as those of the third micro lens 43 respectively. With respect to the specific structure, reference may be made to the above content, which is not described herein again.

Figure 9C:
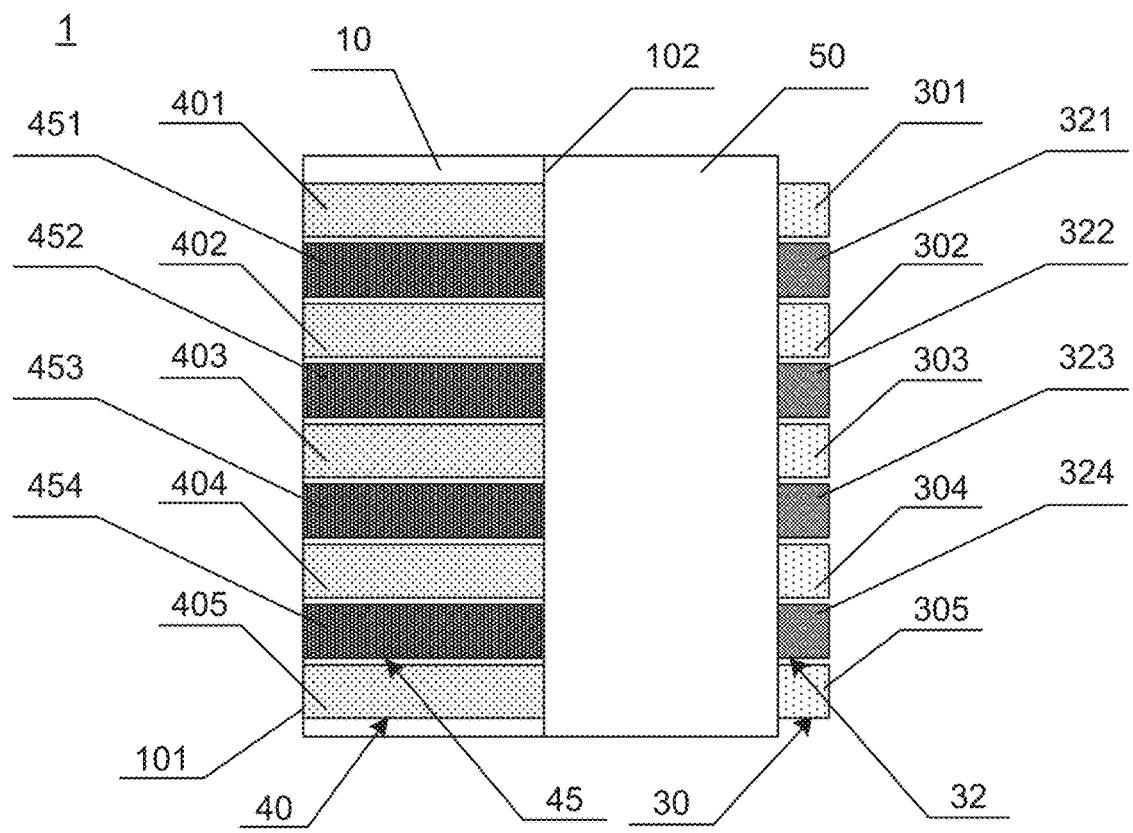
FIG. 9C is a schematic diagram of yet another near-eye display apparatus, in accordance with some embodiments.

It will be noted that, as shown in FIGS. 9A-9C, the near-eye display apparatus 1 may include a plurality of auxiliary pixel islands that may be arranged in an array and a plurality of auxiliary combined micro lenses that may be arranged in an array, which can arranged in a one-to-one correspondence; and may also include a plurality of pixel islands that may be arranged in an array and a plurality of combined micro lenses that may be arranged in an array, which can arranged in a one-to-one correspondence. It will be noted that, FIGS. 9A to 9C only schematically illustrate the near-eye display apparatus 1, and do not limit the actual structure and arrangement of the near-eye display apparatus 1.

In addition, the structure of the near-eye display apparatus 1 is exemplarily described below.

As shown in FIG. 9C, the near-eye display apparatus 1 includes a base 10, a combined micro lens array disposed in the base 10, a pixel island array 30 located on the second surface 102 of the base 10, and a planarization layer 50. The combined micro lens array 40 includes a plurality of combined micro lenses 401 to 405 spaced apart from each other, and each of the combined micro lens 401 to 405 may be a combined micro lens as described in any one of the embodiments. The pixel island array 30 includes a plurality of pixel islands 301 to 305 spaced apart from each other, and each of the pixel islands 301 to 305 may be a pixel island as described in any one of the embodiments. The combined micro lenses 401 to 405 are in one-to-one correspondence with the pixel islands 301 to 305, and each pixel island is disposed on a focal plane of the corresponding combined micro lens. For example, the first pixel island 301 corresponds to the first combined micro lens 401, and the first pixel island 301 is disposed on the focal plane of the first combined micro lens 401; the second pixel island 302 corresponds to the second combined micro lens 402, and the second pixel island 302 is disposed on the focal plane of the second combined micro lens 402; and so on. Each pixel island is disposed on a sight line axis of the first micro lens in the corresponding combined micro lens.

The near-eye display apparatus 1 further includes an auxiliary combined micro lens array 45 disposed in the base 10, and an auxiliary pixel island array 32 disposed on the surface of the planarization layer 50 facing away from the base 10. The auxiliary combined lens array 45 includes a plurality of auxiliary combined micro lenses 451 to 454 spaced apart from each other, each auxiliary combined micro lens is disposed between two adjacent combined micro lenses, and each of the auxiliary combined micro lens 451 to 454 may be a combined micro lens as described in any one of the embodiments. The auxiliary pixel island array 32 includes a plurality of auxiliary pixel islands 321 to 324 spaced apart from each other, each auxiliary pixel island is disposed between two adjacent pixel islands, and each of the auxiliary pixel islands 321 to 324 may be a pixel island as described in any one of the embodiments. The auxiliary combined micro lenses 451 to 454 are in one-to-one correspondence with the auxiliary pixel islands 321 to 324, and each auxiliary pixel island is disposed on a focal plane of the corresponding auxiliary combined micro lens. Each auxiliary pixel island is disposed on a sight line axis of the auxiliary first micro lens in the corresponding auxiliary combined micro lens.

Herein, the sight line axis of the auxiliary first micro lens is a straight line connecting the center of the eye, the center of the auxiliary first micro lens and the center of the auxiliary pixel island. With respect to the designed near-eye display apparatus, a distance from the center of the eye to the center of the auxiliary first micro lens (i.e., the eye relief L) is fixed, so the sight line axis of the auxiliary first micro lens is a determinate straight line.

For example, as shown in FIG. 9C, the first auxiliary combined micro lens 451 is disposed between the first combined micro lens 401 and the second combined micro lens 402, and the first auxiliary combined micro lens 451 and the first combined micro lens 401 are the same micro lenses, i.e., have the same size and optical parameters; the second auxiliary combined micro lens 452 is disposed between the second combined micro lens 402 and the third combined micro lens 403, and the second auxiliary combined micro lens 452 and the second combined micro lens 402 are same micro lenses, i.e., have the same size and optical parameters; and so on. The first auxiliary pixel island 321 is disposed between the first pixel island 301 and the second pixel island 302, and the first auxiliary pixel island 321 and the first pixel island 301 are same pixel islands, i.e., have the same size and color; the second auxiliary pixel island 322 is disposed between the second pixel island 302 and the third pixel island 303, and the second auxiliary pixel island 322 and the second pixel island 302 are same pixel islands, i.e., have the same size and color; and so on.

In this way, a reuse of a view angle is realized by providing the auxiliary combined micro lens array and the auxiliary pixel island array. The reuse of the view angle means that the auxiliary pixel island is inserted between two adjacent pixel islands and the auxiliary combined micro lens is inserted between two adjacent combined micro lenses correspondingly.

Figure 10:
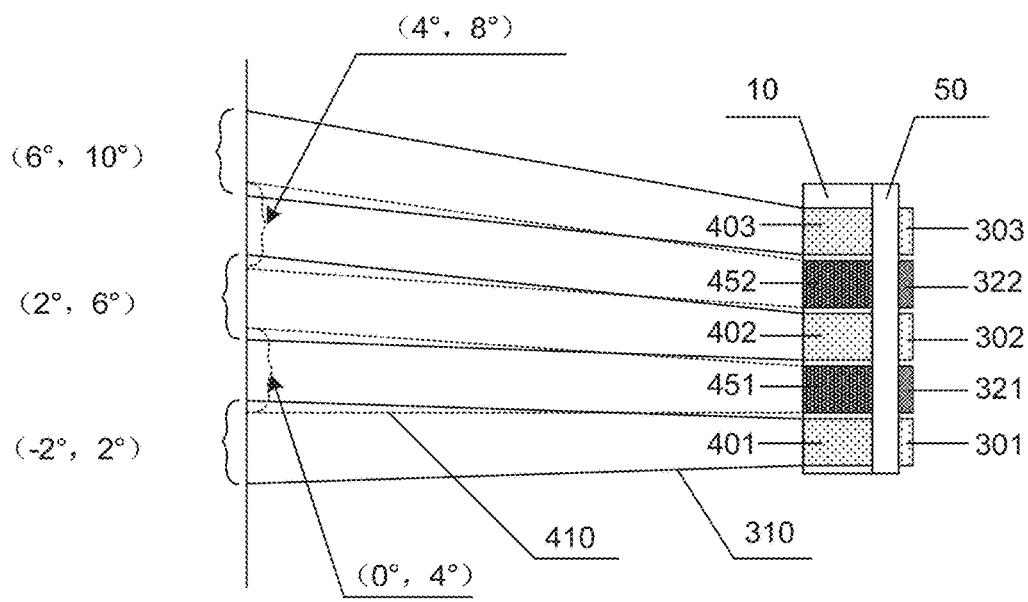
FIG. 10 is a diagram showing a working principle of a near-eye display apparatus, in accordance with some embodiments.

For example, as shown in FIG. 10, a first auxiliary pixel island 321, of which a size and a color are the same as those of the first pixel island 301, is inserted between the first pixel island 301 and the second pixel island 302; and a first auxiliary combined micro lens 451, of which the size and optical parameters are the same as those of the first combined micro lens 401 respectively, is inserted between the first combined micro lens 401 corresponding to the first pixel island 301 and the second combined micro lens 402 corresponding to the second pixel island 302.

A range of an angle of the first light 310 that is emitted by the first pixel island and enters an eye after passing through the first combined micro lens 401 may be the same as a range of an angle of the second light 410 that is emitted by the first auxiliary pixel island 321 and enters the eye after passing through the first auxiliary combined micro lens 451, so that the light emitted by the first pixel island 301 and the light emitted by the first auxiliary pixel island 321 may image in the same region after passing through the first combined micro lens 401 and the first auxiliary combined micro lens 451 respectively, which is equivalent to imaging in the same region for twice, and the sizes of obtained images are the same, thus realizing the reuse of the view angle.

Herein, the angle of the light is an angle between a direction of the light passed through the combined micro lens and a direction perpendicular to a plane where the pixel island is located.

According to a principle that when light rays passing through the micro lenses located at different positions enter the eye at the same angle, they may image at the same point on a retina, pixel islands located at different positions may image at the same position. A range of an angle of light emitted by the first pixel island 301 after passing through the first combined micro lens 401 is the same as a range of an angle of light emitted by the first auxiliary pixel island 321 after passing through the first auxiliary combined micro lens 451, so that imaging may be carried out in the same region for twice, and a gray scale may be multiplied under the same refresh rate by adjusting brightness of sub-pixels in the two pixel islands.

Referring to FIG. 10, a working principle of the near-eye display apparatus whose view angle is reused will describe in detail below by taking a reuse of the view angle in a single color as an example. The view angle corresponds to each combined micro lens is 4°. A range of an angle of the first light 310, after passing through the first combined micro lens 401, emitted by the pixel island 301 is (−2°, 2°); a range of an angle of first light, after passing through the second combined micro lens 402, emitted by the pixel island 302 is (2°, 6°); a range of an angle of first light, after passing through the third combined micro lens 403, emitted by the pixel island 303 is (6°, 10°); and so on. Field-of-views of a plurality of pixel islands are stitched together, and thus the pixel islands may be used to display a complete image. The auxiliary pixel island is inserted between two adjacent pixel islands, and the auxiliary combined micro lens is inserted between two adjacent combined micro lenses correspondingly. A range of an angle of the second light 410, after passing through the first auxiliary combined micro lens 451, emitted by the inserted auxiliary pixel island 321 is (0°, 4°); and a range of an angle of second light, after passing through the second auxiliary combined micro lens 452, emitted by the inserted auxiliary pixel island 322 is (4°, 8°). The view angles of the pixel islands are (−2°, 2°), (2°, 6°) and (6°, 10°), and the view angles of the auxiliary pixel islands are (0°, 4°) and (4°, 8°). The view angles (0°, 2°) and (4°, 6°) are the reused view angles, thus realizing the reuse of the view angle.

Trade off exists between a gray scale and a refresh rate of a display device (particularly, a display device using Light Emitting Diodes to display), and it is usually impossible to simultaneously achieve a high refresh rate and a high gray scale. In some embodiments of the present disclosure, the reuse of the view angle is realized by providing the auxiliary combined micro lens array and the auxiliary pixel island array. In this way, high-gray-scale display may be realized in a case where the refresh rate is not changed.

Some embodiments of the present disclosure provide a virtual/augmented reality system. As shown in FIG. 3A, the virtual/augmented reality system 01 includes any near-eye display apparatus 1 as described above. The virtual/augmented reality system 01 may be a helmet-mounted virtual/augmented reality display, or may be other devices or apparatuses with a near-eye display function. FIG. 3A only schematically illustrates the virtual/augmented reality system, but does not limit a shape, a structure, etc. of the virtual/augmented reality system. It will be understood that the virtual/augmented reality system may further include other components.

The near-eye display apparatus in the virtual/augmented reality system has the same structure and beneficial effects as those of the near-eye display apparatus described in the above embodiments. Since a structure and the beneficial effects of the near-eye display apparatus have been described in detail in the foregoing embodiments, details are not described herein again.

In description of some embodiments of the present disclosure, it should be understood that directions or position relationships indicated by terms "middle", "upper", "lower", "front", "back", "vertical", "horizontal", "top", "bottom", "interior", "exterior", etc. are based on directions or position relationships shown in the accompanying drawings, which is merely for describing the embodiments of the present disclosure conveniently and simplifying the description, but not for indicating or implying the indicated devices or elements must have specific directions or be constructed and operated in specific directions, therefore, is cannot be understood as a limitation to the embodiments of the present disclosure.

The embodiments disclosed by the present disclosure are as above, but the content is only used for understanding the embodiments of the present disclosure conveniently, not for limiting the present disclosure. Any person skilled in the art of the present disclosure may make any modifications and variations in the form and details of the embodiments without departing from the spirit and scope of the present disclosure, but the protection scope of the present disclosure should be subject to the scope defined by the appended claims.

What is claimed is:

1. A near-eye display apparatus, comprising:
a pixel island configured to emit first light; and
a combined micro lens disposed at a light exit side of the pixel island, wherein the combined micro lens includes:
an additional micro lens configured to diverge the first light emitted by the pixel island; and
a first micro lens disposed at a side of the additional micro lens away from the pixel island, and configured to collimate light passed through the additional micro lens, wherein
the pixel island is disposed on a focal plane of the combined micro lens.

2. The near-eye display apparatus according to claim 1, further comprising a base having a first surface and a second surface opposite to the first surface, wherein
the additional micro lens includes a plurality of second micro lenses, the first micro lens is a protrusion formed in the first surface of the base, and each second micro lens is a groove formed in the second surface of the base.

3. The near-eye display apparatus according to claim 2, wherein a radius of curvature of each second micro lens is less than a radius of curvature of the first micro lens, and a diameter of a maximum section of the second micro lens perpendicular to its optical axis is less than a diameter of a maximum section of the first micro lens perpendicular to its optical axis.

4. The near-eye display apparatus according to claim 3, wherein the plurality of second micro lenses are symmetrically or substantially symmetrically arranged with respect to a sight line axis of the first micro lens.

5. The near-eye display apparatus according to claim 3, wherein the diameter of the maximum section of the first micro lens perpendicular to its optical axis is in a range of approximately 0.7 mm to approximately 1.0 mm, and the diameter of the maximum section of the second micro lens perpendicular to its optical axis is approximately 10% to approximately 50% of the diameter of the maximum section of the first micro lens perpendicular to its optical axis.

6. The near-eye display apparatus according to claim 2, further comprising a planarization layer, wherein the planarization layer is disposed on the second surface of the base and covers the second surface of the base, the pixel island is disposed on a surface of the planarization layer facing away from the base, and a refractive index of the planarization layer is less than a refractive index of the base.

7. The near-eye display apparatus according to claim 6, wherein the refractive index of the base is in a range of approximately 1.5 to approximately 1.7, and the refractive index of the planarization layer is in a range of approximately 1.0 to approximately 1.3.

8. The near-eye display apparatus according to claim 1, further comprising:
a base having a first surface and a second surface opposite to the first surface, wherein the first micro lens is disposed at the first surface;
an auxiliary planarization layer disposed on the second surface of the base; and
an auxiliary base disposed on a surface of the auxiliary planarization layer facing away from the base, wherein the additional micro lens is a groove formed in a surface of the auxiliary base facing the base, and a center of the pixel island is on a sight line axis of the first micro lens.

9. The near-eye display apparatus according to claim 8, further comprising a planarization layer disposed on a surface of the auxiliary base facing away from the base, wherein
the pixel island is disposed on a surface of the planarization layer facing away from the base, and a refractive index of the planarization layer and a refractive index of the auxiliary planarization layer are less than a refractive index of the auxiliary base formed with the additional micro lens.

10. The near-eye display apparatus according to claim 8, wherein the first micro lens is a protrusion formed in the first surface of the base.

11. The near-eye display apparatus according to claim 8, wherein a diameter of a maximum section of the additional micro lens perpendicular to its optical axis is equal to a diameter of a maximum section of the first micro lens perpendicular to its optical axis.

12. The near-eye display apparatus according to claim 1, further comprising:
an auxiliary combined micro lens disposed between two adjacent combined micro lenses; and
an auxiliary pixel island configured to emit second light and disposed between two adjacent pixel islands, wherein the auxiliary pixel island is disposed on a focal plane of the auxiliary combined micro lens; wherein
the combined micro lens is configured to receive the first light emitted by the pixel island and collimate the first light, and the auxiliary combined micro lens is configured to receive the second light emitted by the auxiliary pixel island and collimate the second light, and a range of an angle between light passed through the combined micro lens and a direction perpendicular to a plane where the auxiliary pixel island and the two adjacent pixel islands are located at least partially overlaps with a range of an angle between light passed through the auxiliary combined micro lens and the direction perpendicular to the plane where the auxiliary pixel island and the two adjacent pixel islands are located.

13. The near-eye display apparatus according to claim 12, wherein
the auxiliary combined micro lens includes:
an auxiliary additional micro lens disposed between two adjacent additional micro lenses and configured to diverge the second light emitted by the auxiliary pixel island; and
an auxiliary first micro lens disposed between two adjacent first micro lenses and configured to collimate light passed through the auxiliary additional micro lens, wherein
the auxiliary additional micro lens and the additional micro lens are same micro lenses, and the auxiliary first micro lens and the first micro lens are same micros.

14. The near-eye display apparatus according to claim 13, further comprising:
a base having a first surface and a second surface opposite to the first surface, wherein the auxiliary first micro lens and the first micro lens are protrusions formed in the first surface of the base, the auxiliary additional micro lens includes a plurality of auxiliary second micro lenses, the additional micro lens includes a plurality of second micro lenses, and each auxiliary second micro lens and each second micro lens are grooves formed in the second surface of the base; and a planarization layer disposed on and covering the second surface of base, wherein the pixel island and the auxiliary pixel island are arranged on a surface of the planarization layer facing away from the base, and a refractive index of the planarization layer is less than a refractive index of the base, wherein each auxiliary second micro lens and each second micro lens are same micro lenses;

a radius of curvature of each second micro lens is less than a radius of curvature of the first micro lens, and a diameter of a maximum section of each second micro lens perpendicular to its optical axis is less than a diameter of a maximum section of the first micro lens perpendicular to its optical axis; and a radius of curvature of each auxiliary second micro lens is less than a radius of curvature of the auxiliary first micro lens, and a diameter of a maximum section of each auxiliary second micro lens perpendicular to its optical axis is less than a diameter of a maximum section of the auxiliary first micro lens perpendicular to its optical axis.

15. The near-eye display apparatus according to claim 13, further comprising:

a base having a first surface and a second surface opposite to the first surface, wherein the first micro lens and the auxiliary first micro lens are protrusions formed in the first surface of the base;

an auxiliary planarization layer disposed on the second surface of the base; and an auxiliary base disposed on a surface of the auxiliary planarization layer facing away from the base, wherein the additional micro lens and the auxiliary additional micro lens each are a groove formed in a surface of the auxiliary base facing the base; and a center of the pixel island is on a sight line axis of the first micro lens, and a center of the auxiliary pixel island is on a sight line axis of the auxiliary first micro lens.

16. The near-eye display apparatus according to claim 15, further comprising a planarization layer disposed on a surface of the auxiliary base facing away from the base, wherein the pixel island and the auxiliary pixel island are disposed on a surface of the planarization layer facing away from the base;

a refractive index of the planarization layer and a refractive index of the auxiliary planarization layer are less than a refractive index of the auxiliary base formed with the additional micro lens and the auxiliary additional micro lens; and a diameter of a maximum section of the additional micro lens perpendicular to its optical axis is equal to a diameter of a maximum section of the first micro lens perpendicular to its optical axis, and a diameter of a maximum section of the auxiliary additional micro lens perpendicular to its optical axis is equal to a diameter of a maximum section of the auxiliary first micro lens perpendicular to its optical axis.

17. A virtual/augmented reality system, comprising the near-eye display apparatus according to claim 1.

* * * * *